2,883,320
Patented Apr. 21, 1959

2,883,320

AGRICULTURAL USES OF 1,8-DIHYDROXY-9-ANTHRONE

Louis G. Nickell, Port Washington, N.Y., assignor to Chas. Pfizer & Co., Inc., Brooklyn, N.Y., a corporation of Delaware No Drawing. Application February 28, 1957
Serial No. 642,973

9 Claims. (Cl. 167—30)

This application is concerned with a new process for the treatment of fungus infections of plants. More particularly it is concerned with the use of a chemical agent for the treatment of plants infected by mildews (which are obligate parasites) and by fusaria.

The obligate parasites with which we are concerned here and the fusaria are types of fungi. Fusaria are responsible for wilts in plants and the obligate parasites are responsible for rusts and mildews.

Wilts are among the most difficult plant diseases to control. Included in the fusaria infections in plants are tomato wilt (*F. oxysporum* f. *lycopersici*); cotton wilt (*F. oxysporum* f. *vasinfectum*); watermelon wilt (*F. oxysporum* f. *niveum*); flax wilt (*F. oxysporum* f. *lini*); cabbage yellows (*F. oxysporum* f. *conglutinans*); banana wilt (*F. oxysporum* f. *cubense*); celery yellows (*F. oxysporum* f. *apii*); pea wilt (*F. oxysporum* f. *pisi*); pea semi wilt (*F. oxysporum* f. *pisi*); muskmelon wilt (*F. oxysporum* f. *melonis*); aster wilt (*F. oxysporum* f. *callistephi*); broad bean wilt (*F. oxysporum* f. *fabae*); and stock wilt (*F. oxysporum* f. *mathioli*). In controlling fusaria caused diseases, the chemical agent of this invention satisfies a long-felt and most important agricultural need. Heretofore in many cases the only effective control for diseases of this type has been to develop fusaria-resistant strains of the plants. For example, J. C. Walker, in Plant Pathology, McGraw-Hill Book Co., Inc., 1950, states that the only practical means of controlling tomato wilt is by the use of resistant varieties of tomatoes. He further states that cabbage yellows is successfully controlled by the use of resistant varieties.

The successful treatment of obligate parasites is an especially insidious problem. Obligate parasites are parasites which will grow only on specific living hosts and will not grow under any other conditions. They are often so specific in their genetic requirements that they will grow only on plants of a particular species. Since they must be on living hosts during their life cycle it appears that they have lost many of their biosynthetic capacities and are directly dependent on living cells to furnish these deficiencies. In other words, the very metabolic pathways which are necessary to the life of the plant are also necessary to the life of the parasite. It is apparent, therefore, that any agent that is capable of killing the parasite is potentially capable of killing the plant. In eradicating obligate parasites the parasiticide interferes with a metabolic pathway and/or pathways of the parasite. Some of these pathways the parasite will have in common with the host. In this event the parasiticide must be so specific in its action that it does not interfere with the metabolism of the host to such an extent as to be fatal. Furthermore, since the organism will not grow in artificial media it is necessary to carry out all testing in vivo.

There are other materials which have been recommended heretofore in the treatment of obligate parasites. These include sulfur, Bordeaux mixture, certain thiodicarboximides and derivatives of crotonic acid. These materials have generally been useful either in preventing or in eradicating mildews. The therapeutic agent of this invention is effective both in preventing and in eradicating mildews which attack roses, beans and other commercially important plants.

When these facts are considered it will be apparent that the discovery of the use of a chemical agent which is so remarkably effective in combatting these parasites is a most important contribution to the art.

It has now been found that the use of a chemical agent namely 1,8-dihydroxy-9-anthrone is particularly effective in the treatment of plants infected with organisms of the fusaria and mildew type. This is indeed a most unexpected discovery since not only is this compound ineffective against these same fungi in vitro, but it is also ineffective against other fungi, for example, *Alternaria solani* either in vitro or in vivo. The compound 1,8-dihydroxy-9-anthrone can be prepared from chrysazin by reduction with hydrogen in the presence of a nickel catalyst at high pressure as described in detail by Zahn and Koch in Berichte, volume 71B, page 172 (1938).

In carrying out the process of the instant invention an infected plant is contacted with 1,8-dihydroxy-9-anthrone. The plant may be contacted with the active agent by any of the various means common to agricultural practice including spraying, dusting, soil infusion or injection.

The active agent of this invention can be used alone but it is so effective and has such high activity that it will be generally desirable to use it in the form of a composition containing at least 0.001% of 1,8-dihydroxy-9-anthrone dispersed in a suitable extending agent.

In this disclosure and in the claims appended thereto the term, "dispersed" is used in the widest possible sense. It includes particles of molecular size held in true solution in a suitable solvent. It includes particles of colloidal size dispersed in a liquid phase in the form of suspensions or emulsions or in the form of particles which are dispersed in a semi-solid viscous carrier such as petrolatum jelly (e.g. that sold under the trademark Vaseline) or soap in which case the particles may be actually dissolved in the carrier or held in suspension in the carrier with the aid of suitable emulsifying or wetting agents. The term "dispersing" also includes particles which may be mixed with and spread throughout a solid carrier so that the composition is in the form of a powder or dust. "Dispersed" also includes compositions suitable for use as aerosols such as a solution, suspension or emulsion in a carrier of the Freon type, for example, Freon-11 (trichloromonofluoromethane), Freon-12 (dichlorodifluoromethane), Freon-22 (monochloro-difluoromethane), Freon-113 (trichlorotrifluoroethane) or Freon-114 (dichlorotetrafluoroethane).

The term, "extending agents" as used in this disclosure and in the appended claims includes any and all of the usual economically practical, commercially available extending agents conveniently used in the agricultural field. It includes, therefore, the solvents of a true solution, the liquid phase of suspensions, emulsions or aerosols, the semi-solid carrier of ointments and the solid phase of dust and powders. These agents should, of course, be non-toxic to the plants at the levels employed and chemically inert towards 1,8-dihydroxy-9-anthrone.

It has been found that 1,8-dihydroxy-9-anthrone is effective when dispersed in an extending agent at concentrations of 0.001% by weight or even lower. This concentration is effective when the dispersing agent is liquid but it is preferred, although not necessary, to use more concentrated mixtures when the dispersing agent is a semi-solid or a solid. This is because liquid dispersions which are, of course, suitable for use as sprays or injectable solutions give more intimate contact of the active material with the plant and, therefore, are more effective at lower concentrations.

There are a number of liquid media which can be utilized for the preparation of solutions, suspensions or emulsions of compositions containing 1,8-dihydroxy-9-anthrone.

It has been found that high boiling oils of vegetable origin such as castor oil or olive oil are suitable. Low boiling, more volatile solvents such as acetone, cyclohexane, carbon tetrachloride, ethylene dichloride, tetrachloroethane, hydrogenated naphthalenes, solvent naphtha and the like are also useful. Petroleum fractions, particularly kerosene, are especially useful. For certain applications it may be advantageous to resort to mixtures of solvents. If the active agent is to be applied in an aerosol it is convenient to dissolve it in a suitable solvent and to disperse the resulting solutions in a liquid such as Freon. For such applications it has been found that it is better to employ true solutions of the active agents although it is possible to employ suspensions or emulsions.

The active agent of this invention will often be dispersed either in the form of emulsions or suspensions in an inert carrier such as water with the aid of a capillary active substance. Such capillary substances may be anion-active, cation-active or non-ionizing. There may be mentioned by way of example natural or synthetic soaps, Turkey-red oil, fatty alcohols, sulfonates, esters of fatty acids and the like. Other examples include high molecular weight ammonium compounds as well as condensation products of ethylene and propylene oxides with monohydric and polyhydric alcohols. For use as a powder or dust the 1,8-dihydroxy-9-anthrone compounds can be prepared using any of a number of extending agents either organic or inorganic in nature which are suitable for the manufacture of pulverulent preparations. These include, for example, calcium carbonate, kaolin, bole, kieselguhr, talcum, casein, magnesium carbonate, boric acid and others. Materials of vegetable origin such as powdered cork, powdered wood and powdered walnut shells are also useful. These compositions may be used in the dry form, or by the addition of wetting agents the dried powder can be rendered wettable by water so as to obtain stable aqueous dispersions suitable for use as sprays.

For special purposes it would be advantageous to prepare anti-phytopathogenic compositions in the form of a paste or an ointment by the use of a semi-solid extending agent such as soap or petrolatum jelly with or without the aid of solubility promoters and/or dispersing agents.

In all of the forms described above the dispersions may be provided ready for use or they may be provided in a concentrated form suitable for mixing with other extending agents at the time of application.

It is sometimes advantageous to have other active agents, for example, bactericides or insecticides such as pyrethrum, streptomycin, oxytetracycline, D.D.T. (dichlorodiphenyltrichloroethane), malathion or chlordane in the same composition which contains the 1,8-dihydroxy-9-anthrone. A composition of this nature has the advantage that two or more active agents can be distributed in one and the same application.

As stated above 1,8-dihydroxy-9-anthrone does not show activity in vitro against various fungi. For example, when the compound was tested using the usual in vitro techniques against fusaria generally implicated in potato wilt and in tomato wilt, it was found that concentrations as high as 1,000 mcg./ml. were not effective in controlling the microorganism. Furthermore against *Candida albicans* concentrations as high as 500 mcg./ml. did not control the organism. These concentrations are well outside of the practical range for control of the microorganism.

When 1,8-dihydroxy-9-anthrone was tested in vivo against early tomato blight (*Alternaria solani*) it was found that at concentrations as high as 0.008% the compound was completely ineffective in controlling the disease.

In contrast to these findings it was found that the compound is effective in controlling bean mildew (*Erysiphe polygoni*). For this test 1,8-dihydroxy-9-anthrone was dissolved in water containing 5% acetone and sprayed on a series of bean plants harboring a very heavy infection of bean mildew. Groups of plants were sprayed with different strength suspensions and one group was sprayed with an acetone-water solution which did not contain any active agent. This latter group served as a control. It was found that at the end of three days the disease had completely disappeared from those plants which had been sprayed with solutions containing 0.04% by weight of 1,8-dihydroxy-9-anthrone. Those plants which had been sprayed with mixtures containing 0.008% of the active agent were only slightly infected. The control plants had completely deteriorated. No injury was observed in the treated plants. It is important to note that this foliage which appeared after treatment with the 1,8-dihydroxy-9-anthrone mixture was completely free of infection.

Experiments were carried out to determine the phytotoxicity of 1,8-dihydroxy-9-anthrone. One of these tests is the standard cucumber seed germination test. The germinated cucumber seed is a plant material which is extremely sensitive to inhibitory substances. The test as carried out uses fifty seeeds per level of compound. The fifty seeds are mechanically placed in a plastic box containing a non-toxic absorbent paper such as the paper which is commercially available under the name of Kem-Pack and recommended by the U.S. Department of Agriculture Seed Laboratory and a water suspension (150 ml.) containing 1,8-dihydroxy-9-anthrone is added. After three days' incubation at 28° C. comparisons are made between the seeds which have been treated with the test suspensions and seeds which have been identically treated except that the water did not contain any suspended 1,8-dihydroxy-9-anthrone. These latter seeds serve as a control. The comparisons are made between total wet weight of germinated seedlings and ungerminated seed amongst the treated seeds and the untreated controls. The results of a typical test show 100% germination of untreated controls and 100% germination in test seeds treated with water suspensions containing up to 0.01% of 1,8-dihydroxy-9-anthrone. No significant decrease in weight was noted in the treated plants compared to the controls.

Another phytotoxicity test which was used is the duckweed growth test described in Agricultural and Food Chemistry, volume 2, pages 178–182, February 17, 1954. Duckweed (*Lemna minor*) is also very sensitive to inhibitory agents. When duckweed which was grown under aseptic conditions was treated with an aqueous solution of 1,8-dihydroxy-9-anthrone, no adverse effect on growth was noted at concentrations as high as 0.002%. In fact, at concentrations as high as 0.001% an actual increase in wet and dry weights was observed. The amount and concentration of 1,8-dihydroxy-9-anthrone to be employed against a particular fusarium or mildew will, of course, vary considerably. The type of plant, the type of disease involved, the manner of application, the time of year, weather conditions and the state of development of the plant are among the many factors which are to be considered. In general, however, effective control of fusaria and mildews sensitive to 1,8-dihydroxy-9-anthrone is achieved by applying the antibiotic to the habitat of the pathogen or the area to be protected from phytopathogenic attack in concentrations of at least 0.001% by weight. As stated above, the compound can also be used directly, that is, undiluted with extending agents.

The following examples are given by way of illustration only and are not to be construed as limitations of this invention, many apparent variations of which are possible without departing from the spirit or scope thereof.

Example I

Groups of rose plants with an infection of rose mildew (*Sphaerotheca pannosa* var. *rosae*) were treated by spraying with a water suspension containing 0.04% of 1,8-dihydroxy-9-anthrone. A second group was similarly sprayed, except that the water did not contain any active agent. It was found that at the end of three weeks the infection had completely disappeared from the treated plants. No injurious side effects were observed in the plant and the new foliage which appeared after treatment was completely free of infection while the flower buds were very healthy. The infection in the controls had increased and the new foliage which appeared was also infected.

Example II

Approximately ten days' old tomato plants are pulled from the soil, the roots washed in running water and then dipped into a suspension of spores of *Fusarium lycopersici*, the fungus usually implicated in tomato wilt. These plants are divided into two groups and a third non-infected group is used as a control. One week is allowed for germination of spores, growth of microorganism and infection of the plants to take place. One of the infected groups is then treated by pouring a mixture containing 0.05% of 1,8-dihydroxy-9-anthrone in 2% acetone-water onto the soil. A comparison is then made among the three groups. It is found that the presence of the disease is manifested in the infected but untreated group by various degradations of chlorosis, stunting and vascular discolorations. The group of infected and treated plants have returned to normal growth and compare favorably with the uninfected and untreated controls.

Example III

To a mixture containing 100 g. of pulverized calcium carbonate, 2 g. of olein and one gram slaked lime was added sufficient 1,8-dihydroxy-9-anthrone to give a mixture containing 100 parts per million of 1,8-dihydroxy-9-anthrone and the mixture was ground in a ball mill. The resulting powder is easily scattered, has good adhesive power and is effective against mildews.

Example IV

A mixture of 5 mg. of 1,8-dihydroxy-9-anthrone, 25 g. of talcum, 4 g. of sodium dibutyl naphthalene sulfonate, 4 g. of casein and 5 g. of sodium carbonate was ground in a ball mill. The mixture was added to an equal quantity of ground calcium carbonate and the whole thoroughly mixed. This powder may be suspended in water immediately before use and gives a fusaricidal suspension which is sufficiently stable for use in spraying applications.

Example V

A solution is prepared containing 10 mg. of 1,8-dihydroxy-9-anthrone in 100 g. of carbon tetrachloride. The solution is useful in the treatment of mildews by spraying.

Example VI

A mixture is prepared containing 10 mg. of 1,8-dihydroxy-9-anthrone, 20 g. of xylene and 80 g. of Turkey-red oil. This solution can be readily emulsified in water and the fusaricidal emulsion is suitable as a spray.

Example VII

A suspension of 100 g. of finely ground calcium carbonate in an acetone solution containing 8 mg. of 1,8-dihydroxy-9-anthrone is prepared and the acetone evaporated in vacuo. The resulting powder is easily scattered and is effective against mildews.

Example VIII

A solution is prepared containing 20 mg. of 1,8-dihydroxy-9-anthrone and 5 g. of DDT in 90 g. of kerosene. This solution is useful as a spray.

Example IX

A solution containing 15 mg. of 1,8-dihydroxy-9-anthrone, 4 g. of acetone and 160 g. of Freon-12 is prepared and used as a fusaricidal agent in an aerosol form.

Example X 1,8-dihydroxy-9-anthrone was dissolved in water containing 5% acetone to give a solution which contained 200 parts per million by weight of 1,8-dihydroxy-9-anthrone. The solution was used as a spray and was found to be an effective fusaricidal agent.

Example XI 1,8-dihydroxy-9-anthrone was dispersed with petroleum jelly to give a mixture which contained 10% by weight of the active agent. The mixture was found to be effective in treating plants which had been attacked by mildews.

Example XII 1,8-dihydroxy-9-anthrone was suspended in sterile water to give a concentration of 0.008%. The suspension was useful for the injection of banana plants which had been infected by *F. oxysporum* f. *cubense*.

What is claimed is:

1. A process for treating plants infected with fusaria and mildews, which comprises contacting the fungi-infected plant with 1,8-dihydroxy-9-anthrone.
2. A process as in claim 1 in which the 1,8-dihydroxy-9-anthrone is in the form of a composition containing at least 0.001% of said 1,8-dihydroxy-9-anthrone.
3. A process as in claim 1 in which the 1,8-dihydroxy-9-anthrone is in the form of a solid composition containing at least 0.001% of said 1,8-dihydroxy-9-anthrone.
4. A process as in claim 1 in which the 1,8-dihydroxy-9-anthrone is in the form of a liquid composition containing at least 0.001% of said 1,8-dihydroxy-9-anthrone.
5. A process which comprises contacting, with 1,8-dihydroxy-9-anthrone, a plant infected with a fusarium.
6. A process which comprises contacting, with 1,8-dihydroxy-9-anthrone, a plant infected with a mildew.
7. A process for the treatment of bean mildew which comprises contacting a plant infected with bean mildew with 1,8-dihydroxy-9-anthrone.
8. A process for the treatment of rose mildew which comprises contacting a plant infected with rose mildew with 1,8-dihydroxy-9-anthrone.
9. A process for the treatment of tomato wilt which comprises contacting a plant infected with tomato wilt with 1,8-dihydroxy-9-anthrone.

References Cited in the file of this patent

Frear: A Catalogue of Insecticides and Fungicides, Chronica Botanica Comp. (1949), vol. II, page 42.